US012681588B2

(12) United States Patent
Su

(10) Patent No.: US 12,681,588 B2
(45) Date of Patent: Jul. 14, 2026

(54) MOUSE STRUCTURE

(71) Applicant: Silitek Electronics (Dongguan) Co., Ltd, Guang Dong (CN)

(72) Inventor: Wei-Wu Su, Guang Dong (CN)

(73) Assignee: SILITEK ELECTRONICS (DONGGUAN) CO., LTD, Guang Dong (CN)

( * ) Notice: Subject to any disclaimer, the term of this patent is extended or adjusted under 35 U.S.C. 154(b) by 0 days.

(21) Appl. No.: 19/079,517

(22) Filed: Mar. 14, 2025

(65) Prior Publication Data

US 2026/0064210 A1     Mar. 5, 2026

(30) Foreign Application Priority Data

Aug. 27, 2024   (CN) .......................... 202411192279.8

(51) Int. Cl.
*G06F 3/0354* (2013.01)
(52) U.S. Cl.
CPC ................................ *G06F 3/03543* (2013.01)
(58) Field of Classification Search
CPC ................................................... G06F 3/03543
See application file for complete search history.

(56) References Cited

FOREIGN PATENT DOCUMENTS

CN       202976002 U   *   6/2013
CN       202976004 U   *   6/2013

* cited by examiner

*Primary Examiner* — Nitin Patel
*Assistant Examiner* — Amen W Bogale
(74) *Attorney, Agent, or Firm* — WPAT, PC

(57) ABSTRACT

A bendable mouse structure is provided. The mouse structure includes a main body, an extension portion and at least one first connecting member. The main body includes a button portion. The first connecting member is connected between the main body and the extension portion. The first connecting member includes a first fixing portion, a second fixing portion and a rotating shaft. The first fixing portion is fixed on one of the main body and the extension portion. The second fixing portion is fixed on another one of the main body and the extension portion. The rotating shaft is disposed between the first fixing portion and the second fixing portion, so that the first fixing portion and the second fixing portion are pivotally connected to each other, wherein the rotating shaft includes a first damping structure and the second damping structure.

18 Claims, 9 Drawing Sheets

30

310(312)

350(354)

316

3342

320

30

310(312)

350(354)

316

3342

320

30'

30'

MOUSE STRUCTURE

This application claims the benefit of People's Republic of China Application No. 202411192279.8, filed Aug. 27, 2024, the subject matters of which are incorporated herein by reference.

BACKGROUND OF THE INVENTION

Field of the Invention

The invention relates in general to a mouse structure, and more particularly to a bendable mouse structure.

Description of the Related Art

With the frequent use of computers, the demand for the use of mouse structures has gradually increased. If you need to use the computer and mouse structure in different situations (such as offices, conference rooms, outdoors or other usage situations), you need to consider the portability of the computer and mouse structure. Traditional mouse structures are relatively large and not easy to carry. Therefore, there is still an urgent need to improve the design of mouse structures.

SUMMARY OF THE INVENTION

The invention relates to a bendable mouse structure, making the mouse structure easy to carry.

According to an embodiment of the present invention, a bendable mouse structure is provided. The mouse structure includes a main body, an extension portion and at least one first connecting member. The main body includes a button portion. The first connecting member is connected between the main body and the extension portion. The first connecting member includes a first fixing portion, a second fixing portion and a rotating shaft. The first fixing portion is fixed on one of the main body and the extension portion. The second fixing portion is fixed on another one of the main body and the extension portion. The rotating shaft is disposed between the first fixing portion and the second fixing portion, so that the first fixing portion and the second fixing portion are pivotally connected to each other, wherein the rotating shaft includes a first damping structure and the second damping structure.

According to another embodiment of the present invention, a bendable mouse structure is provided. The mouse structure includes a main body, an extension portion and a first connecting member. The main body includes a button portion. The first connecting member is connected between the main body and the extension portion, wherein the first connecting member includes a first fixing portion, a second fixing portion and a rotating shaft. The first fixing portion is fixed on the main body, wherein the first fixing portion includes a solid structure and a torsion spring structure. The torsion spring structure includes a front portion, a middle portion and a rear portion connected to each other. The front portion is disposed between the main body and the solid structure. The second fixing portion is fixed on the extension portion, wherein the second fixing portion includes a cover plate and a control button. The cover plate is disposed on the control button and covers the rear portion of the torsion spring structure, and the cover plate includes a through hole to expose an exposed portion of the control button. The rotating shaft is connected to the solid structure and passes through the middle portion of the torsion spring structure. The rotating shaft includes a first damping structure and a second damping structure.

The above and other aspects of the invention will become better understood with regard to the following detailed description of the preferred but non-limiting embodiment(s). The following description is made with reference to the accompanying drawings.

DETAILED DESCRIPTION OF THE INVENTION

The following will describe in detail various embodiments of the present invention, and with the help of drawings as examples. In addition to these detailed descriptions, the present invention can also be widely implemented in other embodiments, and any easy replacement, modification, and equivalent changes of the embodiments are included in the scope of the present invention and are subject to the subsequent claims. In the description of the specification, in order to give readers a more complete understanding of the present invention, many specific details and implementation examples are provided; however, these specific details and implementation examples should not be regarded as limitations of the present invention. In addition, well-known steps or elements are not described in detail to avoid unnecessary limitations of the present invention.

Figure 1A:
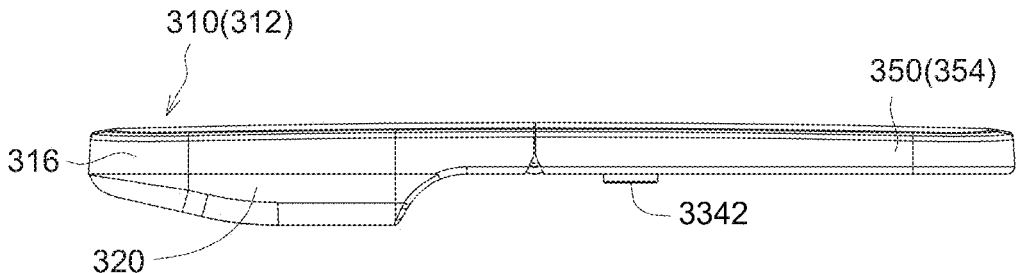
FIG. 1A is a side view of a bendable mouse structure in a flattened state according to an embodiment of the present invention.
Figure 1B:
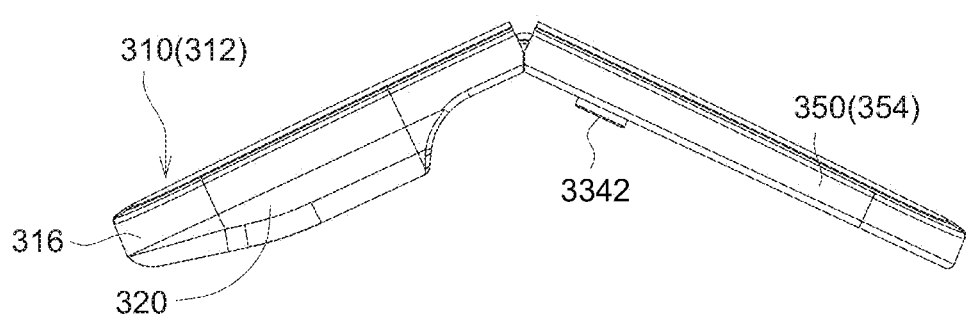
FIG. 1B is a side view of the bendable of the mouse structure in FIG. 1A in a bent state.
Figure 2:
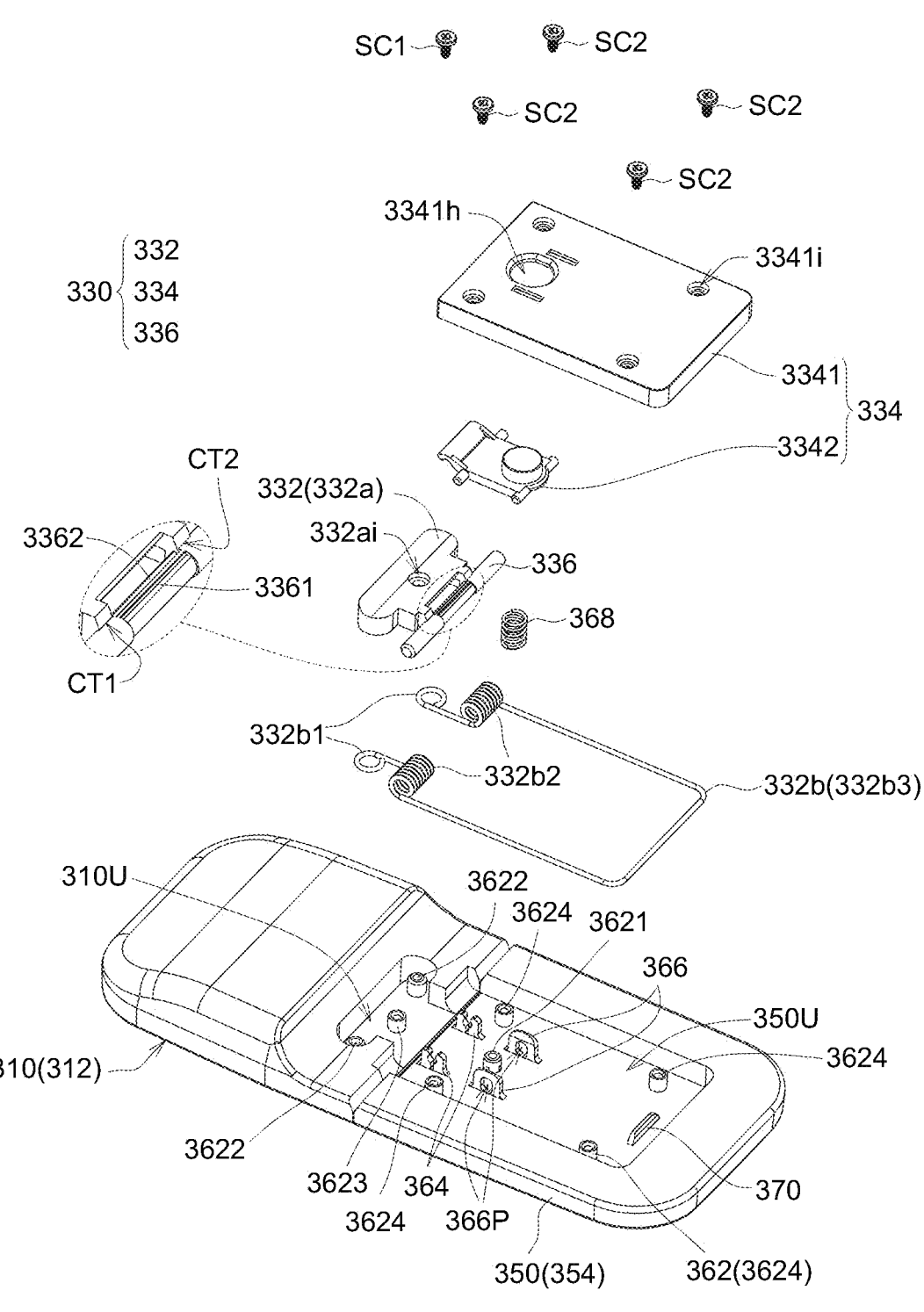
FIG. 2 is an exploded view of the bendable mouse structure of FIG. 1A.
Figure 3A:
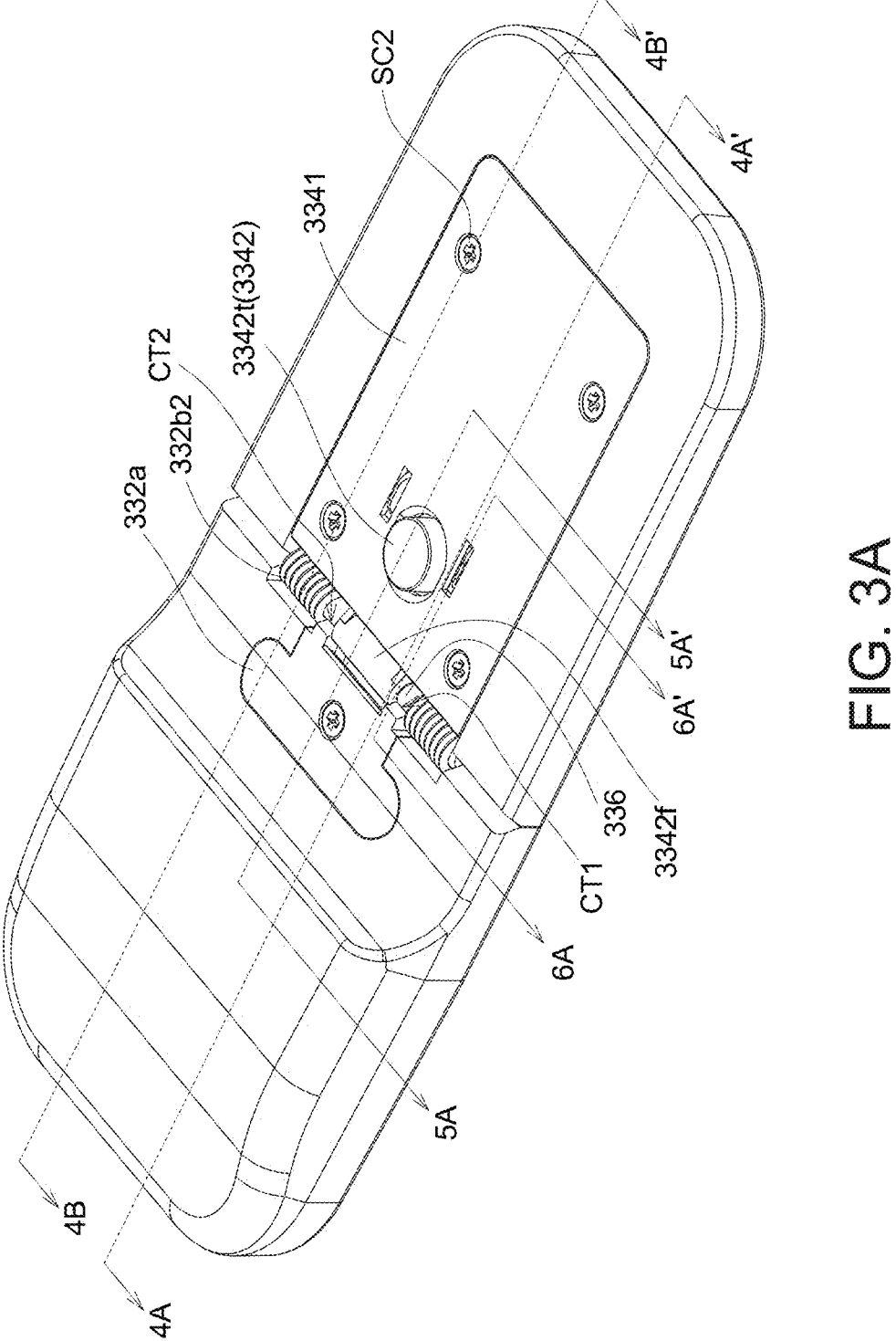
FIG. 3A is a perspective view of the bendable mouse structure of FIG.

FIG. 1A is a side view of a bendable mouse structure 30 in a flattened state according to an embodiment of the present invention. FIG. 1B is a side view of the bendable mouse structure 30 of FIG. 1A in a bent state. FIG. 2 is an exploded view of the bendable mouse structure 30 of FIG. 1A. FIG. 3A is a perspective view of the bendable mouse

Figure 3B:
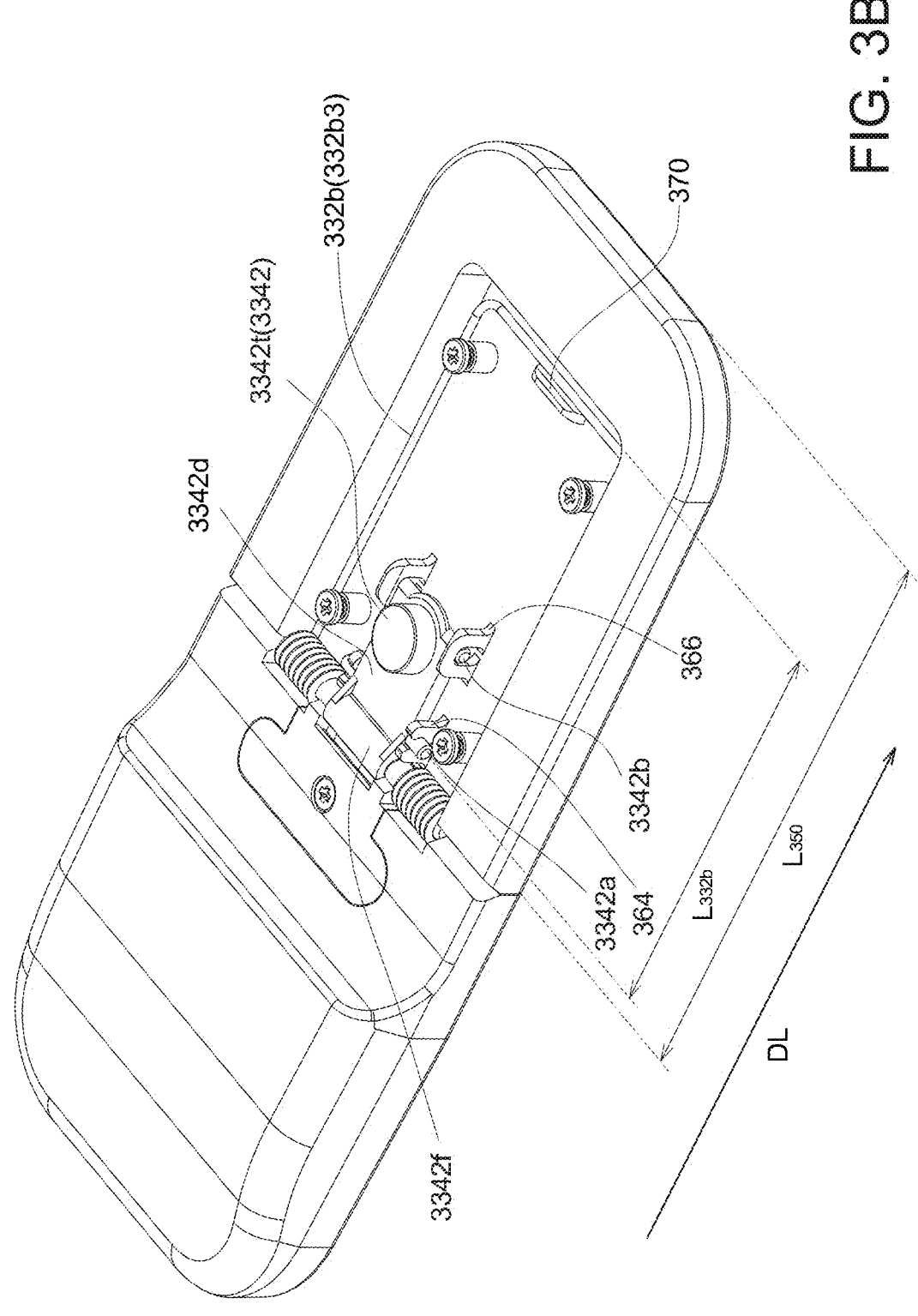
FIG. 3B is a perspective view of the bendable mouse structure of FIG. 3A after the cover plate is hidden.
Figure 4A:
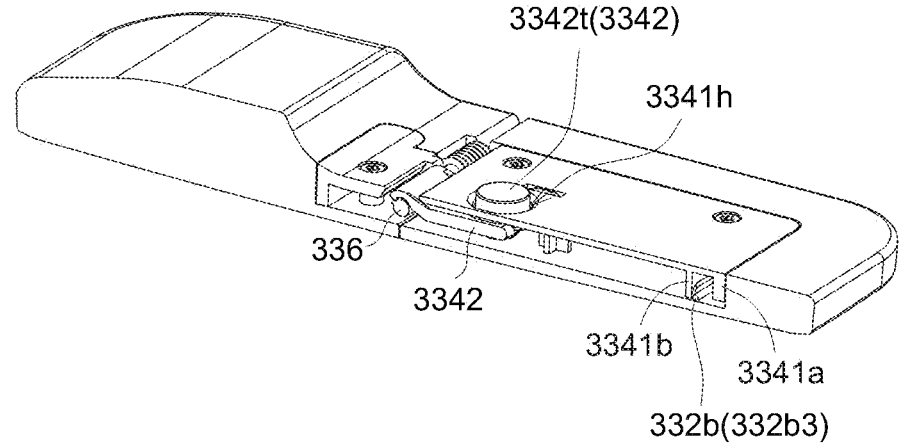
FIG. 4A is a cross-sectional view taken along line 4A-4A' of FIG. 4A.
Figure 4B:
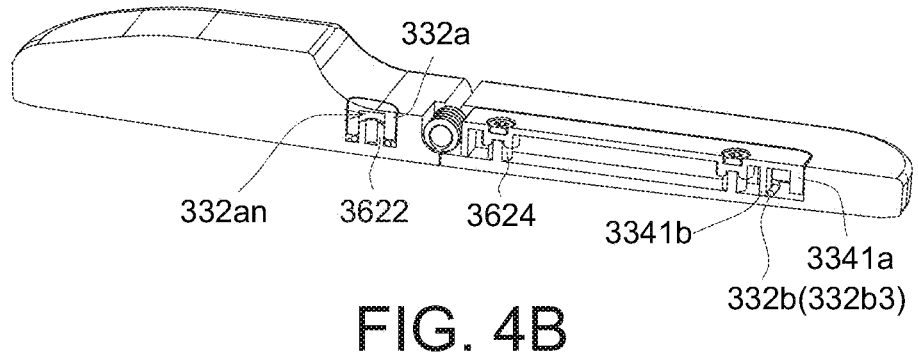
FIG. 4B is a cross-sectional view taken along line 4B-4B' of FIG. 4A.
Figure 4C:
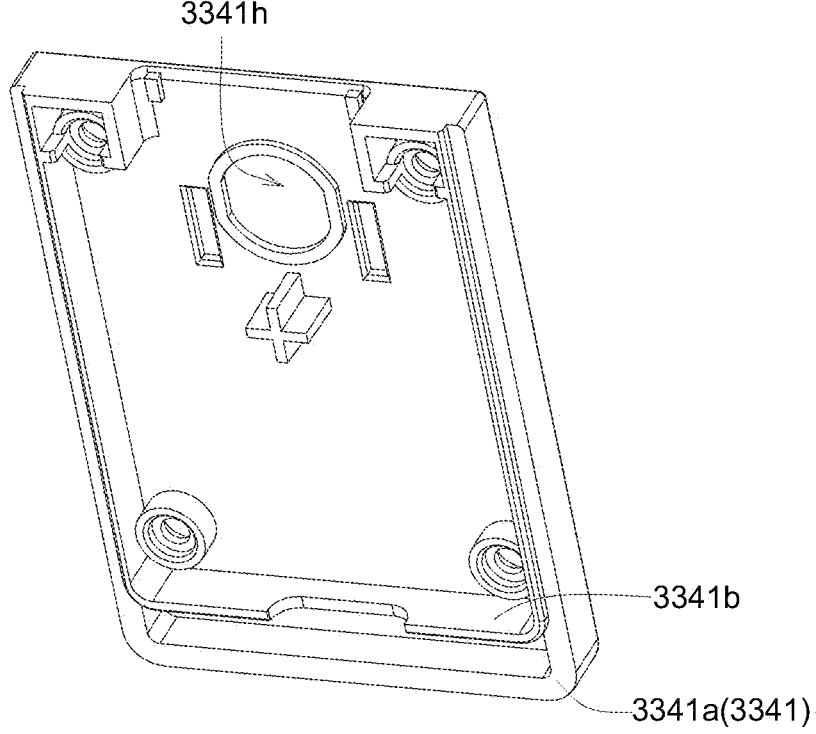
FIG. 4C is a perspective view of the cover plate.
Figure 5A:
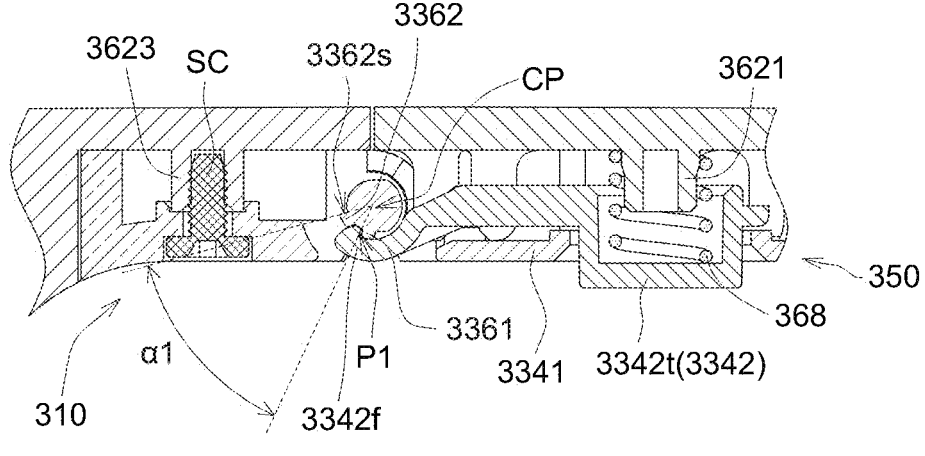
FIG. 5A is a cross-sectional view taken along the line 5A-5A' of FIG. 3A.
Figure 5B:
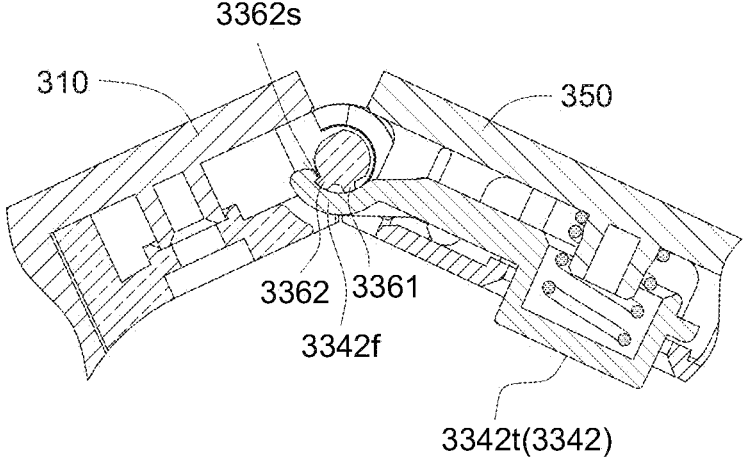
FIG. 5B is a cross-sectional view of the bendable mouse structure in a bent state corresponding to the line 5A-5A' of FIG. 3A.
Figure 6A:
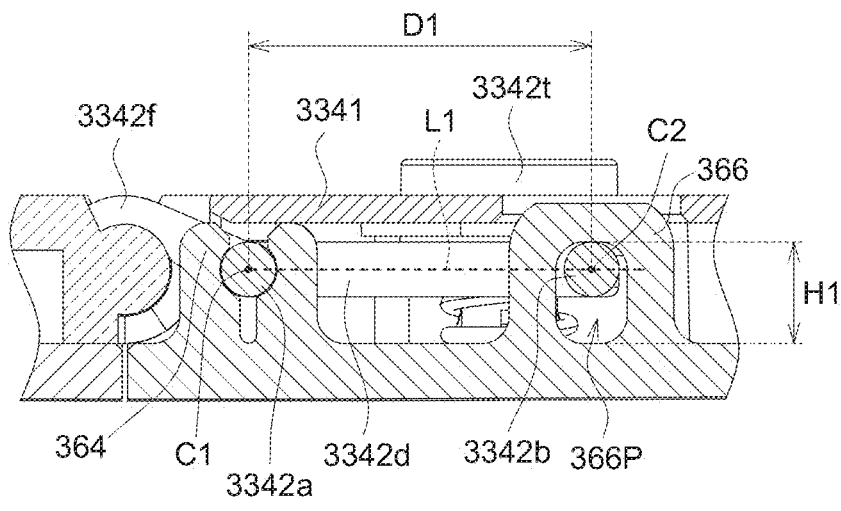
FIG. 6A is a cross-sectional view taken along line 6A-6A' of FIG. 3A.
Figure 6B:
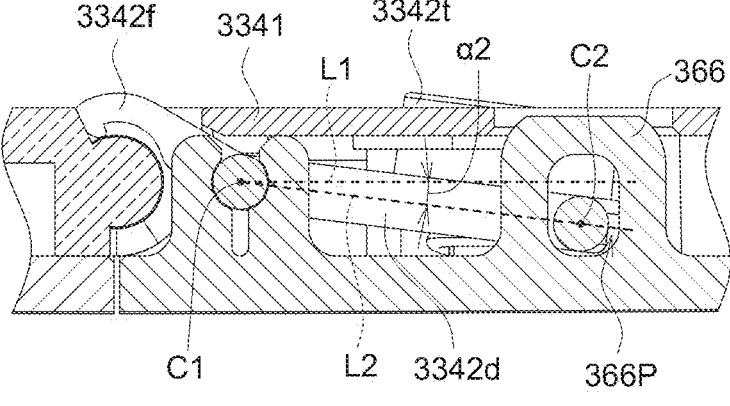
FIG. 6B is a cross-sectional view of the bendable mouse structure in a bent state corresponding to the line 6A-6A' of FIG. 3A.

3 structure 30 of FIG. 1A. FIG. 3B is a perspective view of the bendable mouse structure 30 of FIG. 3A after the cover plate 3341 is hidden. FIG. 4A is a cross-sectional view taken along line 4A-4A' of FIG. 3A. FIG. 4B is a cross-sectional view taken along line 4B-4B' of FIG. 4A. FIG. 4C is a perspective view of the cover plate 3341. FIG. 5A is a cross-sectional view taken along line 5A-5A' of FIG. 3A. FIG. 5B is a cross-sectional view of the bendable mouse structure 30 in a bent state corresponding to the line 5A-5A' of FIG. 3A. FIG. 6A is a cross-sectional view taken along line 6A-6A' of FIG. 3A. FIG. 6B is a cross-sectional view of the bendable mouse structure 30 in a bent state corresponding to the line 6A-6A' of FIG. 3A.

As shown in FIGS. 1A-1B, the present invention provides a bendable mouse structure 30. When the user does not need to use the mouse structure 30 for work, the mouse structure 30 can be unbent and in a flattened state, which is convenient for storage and portability, as shown in FIG. 1A. When the user needs to use the mouse structure 30 for work, the mouse structure 30 can be in a bent state, allowing the user's hand to hold it comfortably and facilitate operation, as shown in FIG. 1B. When the user finishes operating the mouse structure 30, he or she can press the control button 3342 to return the mouse structure 30 from the bent state shown in FIG. 1B to the flattened state shown in FIG. 1A.

Please refer to FIGS. 1A to 2 at the same time. The mouse structure 30 includes a main body 310, an extension portion 350 and a first connecting member 330. The main body 310 includes a button portion 312. The first connecting member 330 is connected between the main body 310 and the extension portion 350, wherein the first connecting member 330 includes a first fixing portion 332, a second fixing portion 334 and a rotating shaft 336. The first fixing portion 332 is fixed on one of the main body 310 and the extension portion 350. The second fixing portion 334 is fixed on another one of the main body 310 and the extension portion 350. The rotating shaft 336 is disposed between the first fixing portion 332 and the second fixing portion 334 so that the first fixing portion 332 and the second fixing portion 334 are pivotally connected to each other. For example, the first fixing portion 332 and the second fixing portion 334 are detachably connected to each other and can move relative to each other (e.g., rotate). The rotating shaft 336 includes a first damping structure 3361 and a second damping structure 3362.

In one embodiment, the main body 310 further includes an upper cover 316 and a lower cover 320. The upper cover 316 is disposed on the lower cover 320, and the button portion 312 covers the upper cover 316. The extension portion 350 includes a base 354. The first fixing portion 332 is fixed on one of the lower cover 320 of the main body 310 and the base 354 of the extension portion 350, and the second fixing portion 334 is fixed on another one of the lower cover 320 of the main body 310 and the base 354 of the extension portion 350.

According to the present embodiment, the first fixing portion 332 is fixed on the main body 310, and the second fixing portion 334 is fixed on the extension portion 350, but the invention is not limited thereto. The first fixing portion 332 includes a solid structure 332a and a torsion spring structure 332b. The torsion spring structure 332b includes a front portion 332b1, a middle portion 332b2, and a rear portion 332b3. The front portion 332b1 and the rear portion 332b3 are connected to each other through the middle portion 332b2. The front portion 332b1 is disposed between the main body 310 and the solid structure 332a. The front portion 332b1 may include a pair of ring structures, the middle portion 332b2 may include a pair of helical structures, and the rear portion 332b3 may include a U-shaped structure.

Please refer to FIGS. 2 to 3B at the same time. The second fixing portion 334 includes a cover plate 3341 and a control button 3342. The cover plate 3341 is disposed on the control button 3342 and covers the rear portion 332b3 of the torsion spring structure 332b, and the cover plate 334 includes a through hole 3341h to expose an exposed portion 3342t of the control button 3342. The rotating shaft 336 is connected to the solid structure 332a and passes through the hole of the helical structures of the middle portion 332b2 of the torsion spring structure 332b. In the present embodiment, the rotating shaft 336 and the solid structure 332a are an integral structure. The middle portion 332b2 of the torsion spring structure 332b surrounds two opposite ends of the rotating shaft 336, for example. The first damping structure 3361 and the second damping structure 3362 are protruding structures disposed in the middle area of the rotating shaft 336 (that is, corresponding to the area between the two middle portions 332b2 of the torsion spring structure 332b). For example, the first damping structure 3361 and the second damping structure 3362 respectively protrude from the rotating shaft 336 and extend along the extension direction of the rotating shaft 336. The second damping structure 3362 is further away from the cover plate 3341 than the first damping structure 3361. Two connection points CT1 and CT2 (in FIGS. 2 and 3A) between the rotating shaft 336 and the solid structure 332a correspond to the area between the two middle portions 332b2 of the torsion spring structure 332b, and are provided on opposite sides of the first damping structure 3361 and the second damping structure 3362.

The control button 3342 includes a front edge portion 3342f, a sheet portion 3342d, a front fixing shaft 3342a, a rear fixing shaft 3342b and an exposed portion 3342t. The front edge portion 3342f, the front fixing shaft 3342a, the rear fixing shaft 3342b and the exposed portion 3342t are connected to the sheet portion 3342d. The front fixing shaft 3342a is closer to the front edge portion 3342f than the rear fixing shaft 3342b. The front edge portion 3342f includes a hook structure for engaging with the first damping structure 3361 or the second damping structure 3362.

Please refer to FIGS. 2 and 3B at the same time. The main body 310 has a front trench 310U, and the extension portion 350 has a rear trench 350U. The solid structure 332a is accommodated in the front trench 310U, and the cover plate 3341 is accommodated in the rear trench 350U. The mouse structure 30 further includes a pair of brackets 364, a pair of limiting members 366, a pressing spring 368 and a plurality of fixing pillars 362. The brackets 364 and the limiting members 366 are disposed on the bottom surface of the rear trench 350U. The brackets 364 are closer to the front edge portion 3342f of the control button 3342 than the limiting members 366. The front fixing shaft 3342a of the control button 334 is disposed on the brackets 364, and the rear fixing shaft 3342b passes through the limiting holes 366P of the limiting members 366. That is, the limiting members 366 form closed structures for limiting the movable space of the rear fixing shaft 3342b.

The fixing pillars 362 are provided on the bottom surface of the front trench 310U and the bottom surface of the rear trench 350U. The fixing pillars 362 include a middle fixing pillar 3621, a front fixing pillar 3623, a pair of first peripheral fixing pillars 3622 and a plurality of second peripheral fixing pillars 3624. The middle fixing pillar 3621 of the fixing pillars 362 is disposed between the brackets 364 and the limiting members 366. The pressing spring 368 is sleeved on the middle fixing pillar 3621 and corresponds to the exposed portion 3342t. The front fixing pillar 3623 and the first peripheral fixing pillar 3622 are provided on the bottom surface of the front trench 310U, and the second peripheral fixing pillars 3624 are provided on the bottom surface of the rear trench 350U.

In the present embodiment, the mouse structure 30 further includes a fixing bar 370. The fixing bar 370 is disposed on the bottom surface of the rear trench 350U and is further away from the main body 310 than the middle fixing pillar 3621. The rear portion 332b3 of the torsion spring structure 332b surrounds the second peripheral fixing pillars 3624 and the fixing bar 370. The first peripheral fixing pillars 3622, the front fixing pillar 3623, the second peripheral fixing pillars 3624 and the fixing bar 370 can assist in positioning the torsion spring structure 332b to prevent forward and backward sliding.

As shown in FIG. 3B, in a longitudinal direction DL of the mouse structure 30, a length L332b of the rear portion 332b3 of the torsion spring structure 332b is less than a length L350 of the extension portion 350. The length L332b of the rear portion 332b3 is, for example, greater than ½ of the length L350 of the extension portion 350. In one embodiment, the length L332b is approximately between 50 mm and 53 mm, and the length L350 is approximately between 70 mm and 73 mm.

As shown in FIG. 2, the mouse structure 30 further includes a plurality of fixing members SC1 and SC2 (such as screws). The fixing member SC1 passes through the fixing hole 332ai in the solid structure 332a and extends to the inside of the front fixing pillar 3623. The fixing members SC2 passes through the fixing holes 3341i in the cover plate 3341 and extend to the inside of the second peripheral fixing pillars 3624, so that the solid structure 332a and the cover plate 3341 are respectively fixed on the main body 310 and the extension portion 350. The solid structure 332a further includes a pair of recessed portions 332an (as shown in FIG. 4B). The front portion 332b1 of the torsion spring structure 332b surrounds the first peripheral fixing pillars 3622. The recessed portions 332an correspond to the first peripheral fixing pillar 3622. For example, the solid structure 332a surrounds the first peripheral fixing pillars 3622 through the recessed portions 332an. It should be understood that the number of fixing members SC, fixing pillars 362, fixing holes 332ai and 3341i, and recessed portions 332an of the present invention are not limited thereto, but can be adjusted according to needs.

Figure 3C:
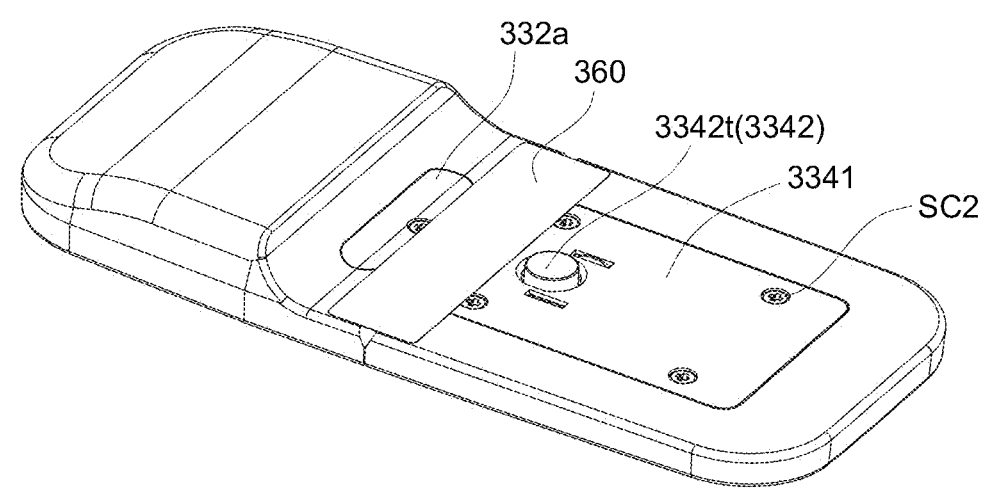
FIG. 3C is a perspective view of a bendable mouse structure according to another embodiment of the present invention.
Figure 3D:
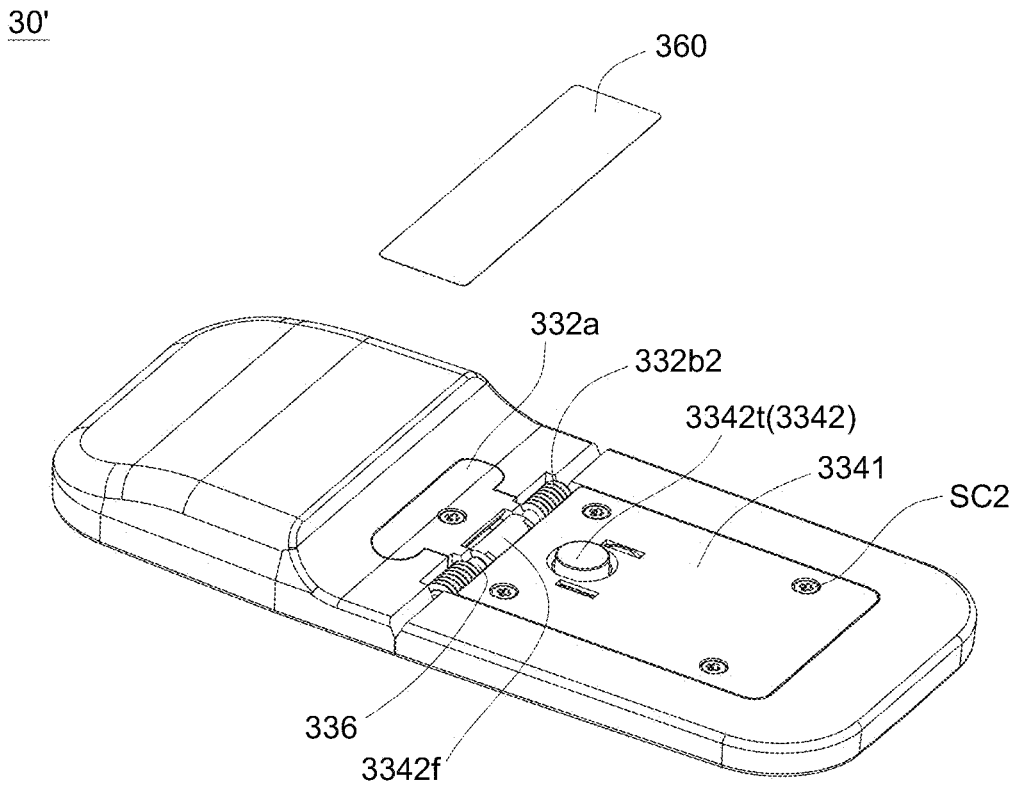
FIG. 3D is a partially exploded view of the bendable mouse structure of FIG. 3C.

According to some embodiments, the mouse structure 30' further includes a shielding sheet 360, as shown in FIGS. 3C to 3D. Except for the shielding sheet 360, the components of the mouse structure 30' are the same as the mouse structure 30, and will not be described again here. The shielding sheet 360 covers at least a portion of the first connecting member 330, and is adhered to the lower cover 320 and the base 354 using, for example, adhesive, so that the appearance of the mouse structure 30' is more beautiful. For example, the shielding sheet 360 covers the rotating shaft 336, the middle portion 332b2 of the torsion spring structure 332b, the front edge portion 3342f of the control button 3342, a portion of the solid structure 332a and a portion of the cover plate 3341. The shielding sheet 360 may be an elastomer or other suitable shielding structure.

As shown in FIGS. 4A and 4C, the cover plate 3341 includes a first partition 3341a and a second partition 3341b. The first partition 3341a protrudes from the periphery of the cover plate 3341 toward the bottom surface of the rear trench 350U and abuts against the side wall of the rear trench 350U, allowing the cover plate 3341 to be secured in the trench 350U. The second partition 3341b may be closer to the through hole 3341h than the first partition 3341a. The rear portion 332b3 of the torsion spring structure 332b can extend between the first partition 3341a and the second partition 3341b. In other embodiments, the cover plate 3341 may not include the second partition 3341b.

Please refer to FIGS. 5A and 5B, the appearance of the first damping structure 3361 is different from the appearance of the second damping structure 3362. For example, the second damping structure 3362 has an engagement surface 3362s on a side surface away from the cover plate 3341 for engaging with the hook structure of the front edge portion 3342f. The slope of the engagement surface 3362s can be greater than the slope of a side surface of the first damping structure 3361 away from the cover plate 3341, so that the hook structure of the front edge portion 3342f can more easily engage with the second damping structure 3362. When the mouse structure 30 is in a flattened state, the hook structure of the front edge portion 3342f of the control button 3342 is disposed between the first damping structure 3361 and the second damping structure 3362 (for example, the hook structure of the front edge portion 3342f is engaged with the first damping structure 3361), as shown in FIG. 5A. When the mouse structure 30 is in a bent state, the hook structure of the front edge portion 3342f of the control button 3342 leaves the position between the first damping structure 3361 and the second damping structure 3362 and engages the engagement surface 3362s of the second damping structure 3362, as shown in FIG. 5B. The engagement surface 3362s is further away from the cover plate 3341 than the position between the first damping structure 3361 and the second damping structure 3362. When the control button 3342 is pressed, the rear fixing shaft 3342b of the control button 3342 approaches toward the bottom surface of the rear trench 350U, causing the hook structure of the front edge portion 3342f to leave the engagement surface 3362s. The torsion spring structure 332b provides restoring force and drives the rotating shaft 336 to rotate, allowing the mouse structure 30 to return to the flattened state, as shown in FIG. 5A.

As shown in FIG. 5A, the first damping structure 3361 has a stop position P1 that is in contact with the hook structure of the front edge portion 3342f. A line connecting the stop position P1 and a center point CP of the rotating shaft forms a bending angle α1 with the engagement surface 3362s. The bending angle α1 is between 50 degrees and 55 degrees. The bending angle α1 corresponds to the bendable angle of the mouse structure 30.

Referring to FIGS. 6A-6B, when the control button 3342 is not pressed, a first connection line L1 is formed between a center point C1 of the front fixing shaft 3342a and a center point C2 of the rear fixing shaft 3342b (as shown in FIG. 6A); when the control button 3342 is pressed, the front fixing shaft 3342a serves as a rotation axis, and the rear fixing shaft 3342b approaches the bottom surface of the rear trench 350U, so that a second connection line L2 is formed between the center point C1 of the front fixing shaft 3342a and the center point C2 of the rear fixing shaft 3342b (as shown in FIG. 6B). According to an embodiment, the angle α2 between the first connecting line L1 and the second connecting line L2 is between 7 degrees and 10 degrees. According to an embodiment, the distance D1 between the center point C1 of the front fixing shaft 3342a and the center point C2 of the rear fixing shaft 3342b is between 12 mm and 12.5 mm. The distance D1 is, for example, the distance between a projection point of the center point C1 vertically projected on the bottom surface of the rear trench 350U and a projection point of the center point C2 vertically projected on the bottom surface of the rear trench 350U. According to an embodiment, a height H1 of the limiting holes 366P of the limiting members 366 is approximately between 3 mm and 4 mm.

According to the present embodiment, the mouse structure 30 is a two-stage bendable mouse structure, but the invention is not limited thereto. In other embodiments, the mouse structure 30 is a three-stage bendable mouse structure (not shown). For example, the extension portion 350 includes a first part (not shown) and a second part (not shown) that can be bent to each other, and the mouse structure 30 further includes a second connecting member (not shown) for connecting the first part (not shown) and the second part (not shown) of the extension portion 350.

In summary, one embodiment of the present invention provides a mouse structure, for example, a bendable mouse structure. The mouse structure includes a main body, an extension portion and a first connecting member. The main body includes a button portion. The first connecting member is connected between the main body and the extension portion, wherein the first connecting member includes a first fixing portion, a second fixing portion and a rotating shaft. The first fixing portion is fixed on the main body, wherein the first fixing portion includes a solid structure and a torsion spring structure. The torsion spring structure includes a front portion, a middle portion and a rear portion connected to each other. The front portion is disposed between the main body and the solid structure. The second fixing portion is fixed on the extension portion, wherein the second fixing portion includes a cover plate and a control button. The cover plate is disposed on the control button and covers the rear portion of the torsion spring structure, and the cover plate includes a through hole to expose an exposed portion of the control button. The rotating shaft is connected to the solid structure and passes through the middle portion of the torsion spring structure. The rotating shaft includes a first damping structure and a second damping structure. Through the mouse structure of the present invention, the user can manually bend the mouse structure in a simple manner so that the mouse structure is in a bent state to facilitate work, and can press the control button to return the mouse structure to a flattened state for easy portability. Compared with the mouse structure that cannot be bent, the mouse structure of the present invention can change its appearance according to the user's needs, making it more convenient to store or carry around.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A bendable mouse structure, comprising:
a main body, comprising a button portion;
an extension portion; and
a first connecting member connected between the main body and the extension portion, wherein the first connecting member comprises:
a first fixing portion fixed on one of the main body and the extension portion;
a second fixing portion fixed on another one of the main body and the extension portion; and

a rotating shaft disposed between the first fixing portion and the second fixing portion, so that the first fixing portion and the second fixing portion being pivotally connected to each other, wherein the rotating shaft comprises a first damping structure and the second damping structure,
wherein the rotating shaft is symmetrical about an axis orthogonal to a longitudinal direction of the rotating shaft, and a bendable angle of the bendable mouse structure is restricted by an interaction between the first damping structure, the second damping structure and the second fixing portion.

2. The bendable mouse structure according to claim 1, wherein the main body further comprises an upper cover and a lower cover, the upper cover is disposed on the lower cover, the button portion covers the upper cover, and the extension portion comprises a base,
wherein the first fixing portion is fixed on one of the lower cover of the main body and the base of the extension portion, and the second fixing portion is fixed on another one of the lower cover of the main body and the base of the extension portion.

3. The bendable mouse structure according to claim 2, further comprising a shielding sheet, the shielding sheet covering at least a portion of the first connecting member.

4. A bendable mouse structure, comprising:
a main body, comprising a button portion;
an extension portion; and
a first connecting member connected between the main body and the extension portion, wherein the first connecting member comprises:
a first fixing portion fixed on the main body, wherein the first fixing portion comprises a solid structure and a torsion spring structure, the torsion spring structure comprises a front portion, a middle portion and a rear portion connected to each other, and the front portion is disposed between the main body and the solid structure;
a second fixing portion fixed on the extension portion, wherein the second fixing portion comprises a cover plate and a control button, the cover plate is disposed on the control button and covers the rear portion of the torsion spring structure, and the cover plate comprises a through hole to expose an exposed portion of the control button; and
a rotating shaft connected to the solid structure and passes through the middle portion of the torsion spring structure, and the rotating shaft comprises a first damping structure and a second damping structure.

5. The bendable mouse structure according to claim 4, wherein the second damping structure is further away from the cover plate than the first damping structure.

6. The bendable mouse structure according to claim 4, wherein the control button further comprises a front edge portion, and when the front edge portion corresponds to the second damping structure, the mouse structure is in a bent state, wherein
the front edge portion comprises a hook structure, and the first damping structure and the second damping structure respectively protrude from the rotating shaft.

7. The bendable mouse structure according to claim 6, wherein an appearance of the first damping structure is different from an appearance of the second damping structure.

8. The bendable mouse structure according to claim 6, wherein the main body has a front trench, the extension portion has a rear trench, the solid structure is accommodated in the front trench, and the cover plate is accommodated in the rear trench.

9. The bendable mouse structure according to claim 8, wherein the mouse structure further comprises a pair of brackets, a pair of limiting members, a pressing spring and a plurality of fixing pillars, the pair of brackets and the pair of limiting members are disposed on a bottom surface of the rear trench, the pair of brackets are closer to the front edge than the pair of limiting members, the fixing pillars are disposed on a bottom surface of the front trench and the bottom surface of the rear trench, wherein a middle fixing pillar of the fixing pillars is disposed between the pair of brackets and the pair of limiting members, the pressing spring is sleeved on the middle fixing pillar and corresponds to the exposed portion; and the control button further comprises a front fixing shaft and a rear fixing shaft, the front fixing shaft is closer to the front edge portion than the rear fixing shaft, the front fixing shaft is disposed on the pair of brackets, and the rear fixing shaft passes through the pair of limiting members.

10. The bendable mouse structure according to claim 9, wherein, when the control button is not pressed, a first connection line is formed between a center point of the front fixing shaft and a center point of the rear fixing shaft; when the control button is pressed, the front fixing shaft serves as a rotation axis, and the rear fixing shaft approaches the bottom surface of the rear trench, so that a second connection line is formed between the center point of the front fixing shaft and the center point of the rear fixing shaft, and an angle between the first connection line and the second connection line is between 7 degrees and 10 degrees.

11. The bendable mouse structure according to claim 10, wherein a distance between the center point of the front fixing shaft and the center point of the rear fixing shaft is between 12 mm and 12.5 mm.

12. The bendable mouse structure according to claim 10, wherein the rear fixing shaft passes through limiting holes of the pair of limiting members, and a height of the limiting holes is between 3 mm and 4 mm.

13. The bendable mouse structure according to claim 9, wherein, when the mouse structure is in a flattened state, the hook structure is disposed at a position between the first damping structure and the second damping structure; when the mouse structure is in a bent state, the hook structure leaves the position between the first damping structure and the second damping structure and engages with an engagement surface of the second damping structure, and the engagement surface is further away from the cover plate than the position between the first damping structure and the second damping structure.

14. The bendable mouse structure according to claim 13, wherein, when the control button is pressed, the rear fixing shaft approaches the bottom surface of the rear trench, causing the hook structure to leave the engagement surface, and the torsion spring structure drives the mouse structure back to the flattened state.

15. The bendable mouse structure according to claim 13, wherein the first damping structure has a stop position abutting the hook structure, and a line connecting the stop position and a center point of the rotating shaft forms a bending angle with the engagement surface, and the bending angle is between 50 degrees and 55 degrees.

16. The bendable mouse structure according to claim 9, wherein the fixing pillars further comprise a front fixing pillar, a pair of first peripheral fixing pillars and a plurality of second peripheral fixing pillars, the front fixing pillar and the pair of first peripheral fixing pillars are disposed on the bottom surface of the front trench, and the second peripheral fixing pillars are disposed on the bottom surface of the rear trench;

the mouse structure further comprising a plurality of fixing members, the fixing members passing through fixing holes in the solid structure and the cover plate and extend to inside of the front fixing pillar and inside of the second peripheral fixing pillars, so that the solid structure and the cover plate are respectively fixed on the main body and the extension portion; and the solid structure further comprises a pair of recessed portions corresponding to the pair of first peripheral fixing pillars, and the front portion of the torsion spring structure surrounds the pair of first peripheral fixing pillars.

17. The bendable mouse structure according to claim 16, wherein the mouse structure further comprises a fixing bar, the fixing bar is disposed on the bottom surface of the rear trench and is further away from the main body than the middle fixing pillar, the middle portion of the torsion spring structure surrounds the rotating shaft, and the rear portion of the torsion spring structure surrounds the second peripheral fixing pillars and the fixing bar.

18. The bendable mouse structure according to claim 9, wherein the cover plate further comprises a first partition protruding from periphery of the cover plate toward the bottom surface of the rear trench and abutting against a side wall of the rear trench.

\* \* \* \* \*